United States Patent
Cai et al.

(10) Patent No.: US 6,889,988 B2
(45) Date of Patent: May 10, 2005

(54) VARIABLE RATE GRIPPED BUSHING SYSTEM

(75) Inventors: Haimian Cai, Ann Arbor, MI (US);
Steve Xi Lin, Northville, MI (US);
Lakshmana Gummadi, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 27 days.

(21) Appl. No.: 10/124,085

(22) Filed: Apr. 17, 2002

(65) Prior Publication Data

US 2003/0197343 A1 Oct. 23, 2003

(51) Int. Cl.⁷ .............................................. B60G 21/055
(52) U.S. Cl. .............................. 280/124.107; 267/293
(58) Field of Search .................. 280/124.107, 124.166; 267/141, 141.2, 145, 152, 153, 293; 29/517

(56) References Cited

U.S. PATENT DOCUMENTS

| | | | |
|---|---|---|---|
| 2,448,769 A | | 9/1948 | Chamberlain |
| 2,808,270 A | | 10/1957 | Müller |
| 2,951,710 A | | 9/1960 | Willetts |
| 3,655,275 A | * | 4/1972 | Seagreaves .................. 385/53 |
| 4,854,766 A | * | 8/1989 | Hein ........................... 403/224 |
| 5,112,031 A | * | 5/1992 | Hynds et al. ................ 267/276 |
| 5,224,790 A | * | 7/1993 | Hein ........................... 403/225 |
| 5,413,374 A | | 5/1995 | Pierce |
| 5,843,264 A | | 12/1998 | Mabuchi et al. |
| 5,884,926 A | | 3/1999 | Muzio et al. |
| 6,094,818 A | | 8/2000 | Ogawa et al. |
| 6,430,774 B1 | * | 8/2002 | McLaughlin et al. ......... 16/2.1 |
| 6,474,631 B2 | | 11/2002 | Hadano et al. |
| 6,513,801 B1 | | 2/2003 | McCarthy |
| 2002/0121733 A1 | * | 9/2002 | Lewis et al. ................. 267/189 |

FOREIGN PATENT DOCUMENTS

| | | | |
|---|---|---|---|
| EP | 093625 | * | 11/1983 |
| EP | 0 707 988 A2 | | 4/1996 |
| EP | 0 911 195 A2 | | 4/1999 |
| FR | 2768661 A | | 3/1999 |
| FR | 2806035 | * | 9/2001 |
| GB | 1516572 | | 7/1978 |
| GB | 2351790 | * | 1/2001 |
| JP | 7-246826 | * | 9/1995 |

* cited by examiner

*Primary Examiner*—Bryan Fischmann
(74) *Attorney, Agent, or Firm*—Brinks Hofer Gilson & Lione

(57) ABSTRACT

A stabilizer bar assembly includes a stabilizer bar having a bushing, a bushing retainer in mechanical compressive engagement with the bushing, and a mounting bracket adapted to connect the stabilizer bar to an automotive vehicle. The bushing retainer can have a uniform outer diameter such that the bushing is compressed uniformly over the entire length of the bushing retainer, or, alternatively, the bushing retainer can have a stepped outer diameter such that the bushing is compressed differently within discrete sections along the length of the bushing retainer. A method of inducing a pre-load onto a bushing that supports a stabilizer bar includes: providing a stabilizer bar, placing a bushing onto the stabilizer bar, placing a bushing retainer, having an first outer diameter onto the bushing, and reducing the outer diameter of the bushing retainer to a second diameter that is smaller than the first diameter.

16 Claims, 13 Drawing Sheets

VARIABLE RATE GRIPPED BUSHING SYSTEM

BACKGROUND OF INVENTION

1. Technical Field of the Invention

The present invention generally relates to a stabilizer bar for an automotive vehicle. More specifically, the present invention relates to the mounting of bushing onto a stabilizer bar that produces a frictional engagement between the bushing and the stabilizer bar.

2. Description of the Prior Art

In an automotive vehicle, a stabilizer bar helps to keep the vehicle level, particularly when the vehicle is traveling through a curve. The ends of the stabilizer bar are connected to the right and left wheel assemblies of the vehicle. A pair of brackets, positioned between the ends of the stabilizer bar, secure the stabilizer bar to a structural component of the vehicle. Rubber bushings positioned between the stabilizer bar and the brackets provide limited torsional, axial and radial movement of the stabilizer bar relative to the bracket. The rubber bushings also dampen the movement of the stabilizer bar. Accordingly, the stiffness, or spring rate, of the bushings affects the feel of the suspension of the vehicle.

To keep the bushings positioned on the stabilizer bar, a stop is usually formed within, or mounted onto, the stabilizer bar. Sometimes the stops are provided as an annular rib, or ribs, extending around the stabilizer bar. This makes the stabilizer bar more difficult to manufacture and adds weight to the stabilizer bar. Alternatively, the bushings can be secured in position on the stabilizer bar by using a chemical bonding agent. This, again, adds cost and complexity to the manufacturing process.

Because the stiffness of the bushing affects the vehicle dynamics, bushings having different stiffness are used in different vehicles. This requires the warehousing of different bushings to provide the varying stiffness needed for different vehicles. Further, after time the bushings loose some resiliency, thereby causing the feel of the suspension in the vehicle to change. In order to repair this condition, the bushing would typically have to be replaced, at significant cost.

As seen from the above, there is a need for an improved stabilizer bar assembly which allows the use of a common bushing to achieve varying stiffness and which can be repaired quickly and economically.

A principle object of this invention is to provide a stabilizer bar assembly that utilizes common components, yet is able to provide varying stiffness for different vehicle applications.

Another object is to provide a stabilizer bar assembly that can be adjusted to compensate for a loss of resiliency in the bushings.

It is also an object of this invention to provide a stabilizer bar assembly having bushings which frictionally engage the stabilizer bar to keep the bushings in position on the stabilizer bar, wherein the bushings are compressed onto the stabilizer bar by a bushing retainer such that the stiffness of the bushing can be adjusted by varying the force at which the bushing retainer compresses the bushings.

SUMMARY OF THE INVENTION

The disadvantages of the prior art are overcome by providing a stabilizer bar assembly, in accordance with the present invention, in which the stabilizer bar assembly includes a stabilizer bar having a bushing mounted thereon. The assembly further includes a bushing retainer that is in mechanical compressive engagement with the bushing such that the bushing is in frictional engagement with the stabilizer bar. A mounting bracket is adapted to connect the stabilizer bar to an automotive vehicle.

In a first aspect of the present invention the bushing retainer has a uniform outer diameter along its entire length such that the bushing is compressed uniformly over the entire length of the bushing retainer.

In another aspect of the present invention, the bushing retainer has a stepped outer diameter such that the bushing is compressed differently within discrete sections along the length of the bushing retainer.

Still another aspect of the present invention is a method of inducing a pre-load onto a bushing that supports a stabilizer bar including: providing a stabilizer bar, placing a bushing onto the stabilizer bar, placing a cylindrical bushing retainer, having a first outer diameter onto the bushing, and reducing the outer diameter of the bushing retainer to a second diameter that is smaller than the first diameter.

The aspects of the present invention provide a stabilizer bar assembly that uses common components, yet can be adjusted for different vehicle applications, and further, allows the bushing assemblies on the stabilizer bar to be repaired after the bushings have lost some of their resiliency.

DETAILED DESCRIPTION OF THE PREFERRED EMBODIMENTS

Figure 1:
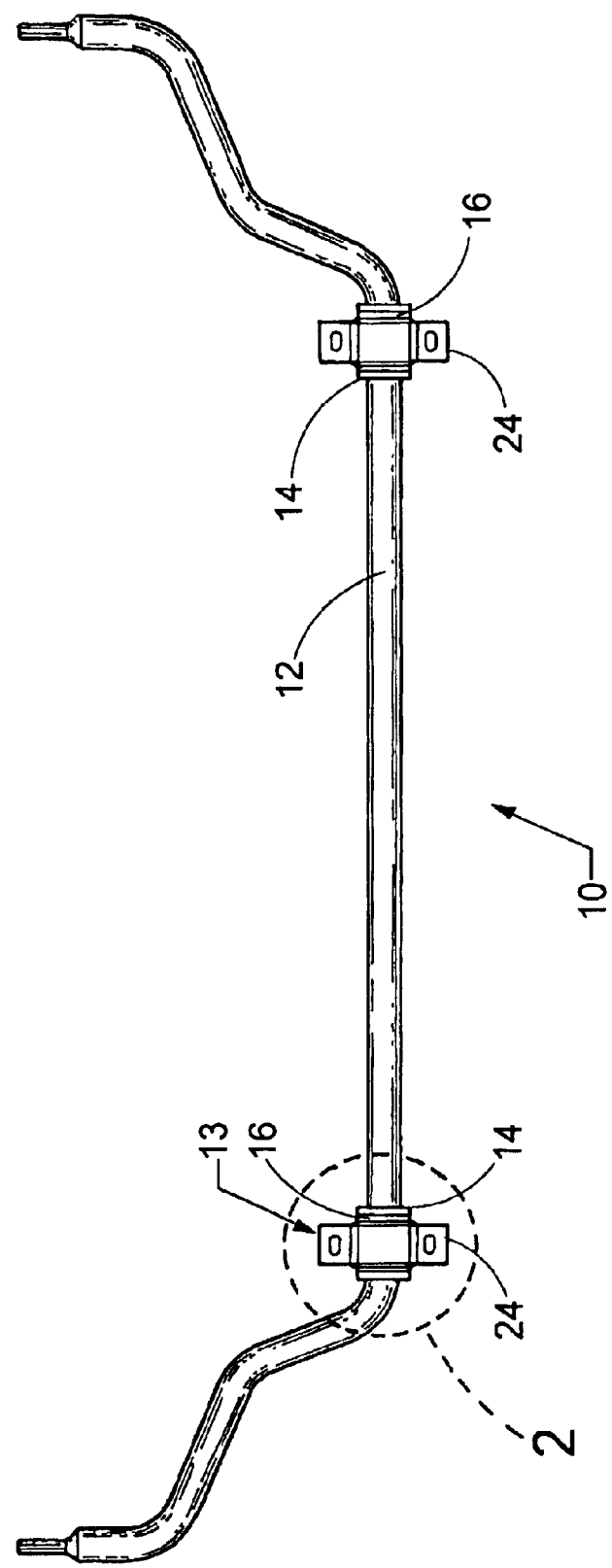
FIG. 1 is a plan view of a stabilizer bar of the present invention.
Figure 2:
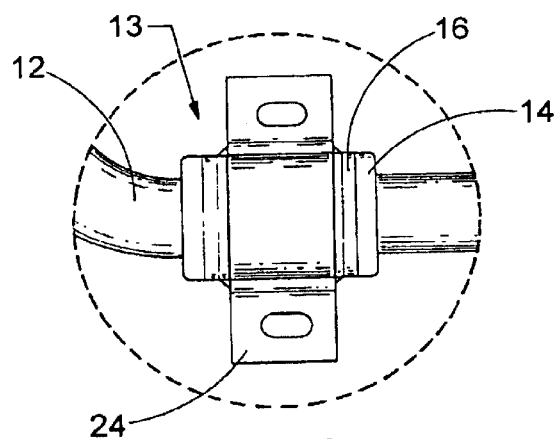
FIG. 2 is an enlarged view of the portion of the stabilizer bar shown in FIG. 1 enclosed by the circle numbered 2.
Figure 3:
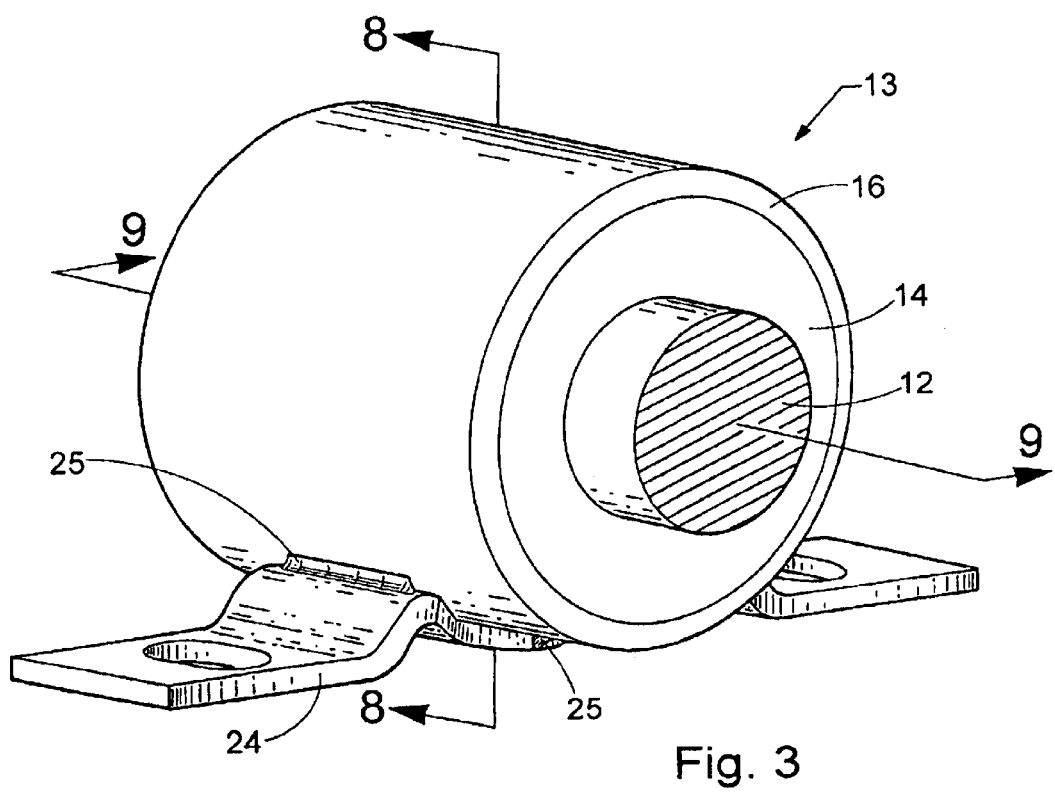
FIG. 3 is a partial perspective view of a first preferred embodiment.

Referring to FIGS. 1–3, a stabilizer bar assembly for an automotive vehicle is shown generally at 10. The stabilizer bar assembly 10 includes a stabilizer bar 12 with at least one bushing assembly 13 mounted thereon. The stabilizer bar 12 is generally made from steel, and can be solid or hollow. It is to be understood, that the stabilizer bar 12 can be made from other suitable materials. The bushing assemblies 13 include a bushing retainer 16 that encompasses a bushing 14 and is in mechanical compressive engagement with the bushing 14 such that the bushing 14 is frictionally engaged with the stabilizer bar 12.

Figure 4:
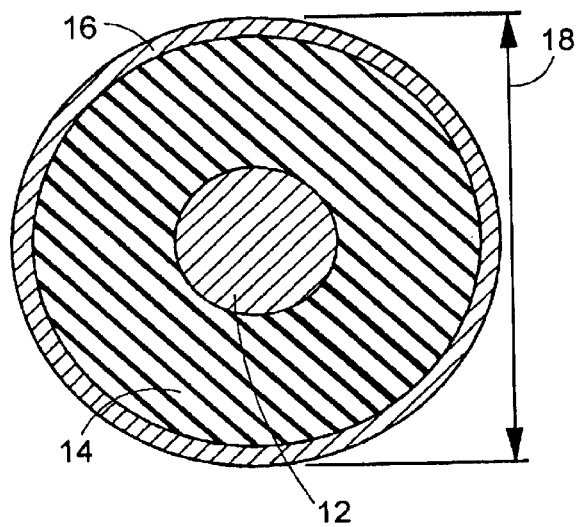
FIGS. 4–7 are sectional views of the first preferred embodiment, shown without a mounting bracket.

The bushing 14 is made from an elastomeric material, such as rubber, or some other resilient material. The bushing 14 is generally sleeve shaped having an cylindrical outer surface and a round passage extending therethrough defining an inner diameter. Preferably, the inner diameter of the bushing 14 is slightly smaller than an outer diameter of the stabilizer bar 12, however it is to be understood that the present invention can be practiced with a bushing 14 having an inner diameter that is equal to or slightly larger than the outer diameter of the stabilizer bar 12. Preferably, the bushing 14 is held onto the stabilizer bar 12 by friction alone. However, an adhesive can also be applied between the inner diameter of the bushing 14 and the stabilizer bar 12 to provide additional retention of the bushing 14 on the stabilizer bar 12. Once the bushing 14 is properly located on the stabilizer bar 12, the bushing retainer 16 is positioned about the bushing 14. Referring to FIG. 4, the bushing retainer 16 is generally sleeve shaped having a cylindrical outer surface defining a first outer diameter 18 and a cylindrical passage extending therethrough defining an inner diameter. The inner diameter of the bushing retainer 16 is large enough to accommodate the bushing 14.

Figure 5:
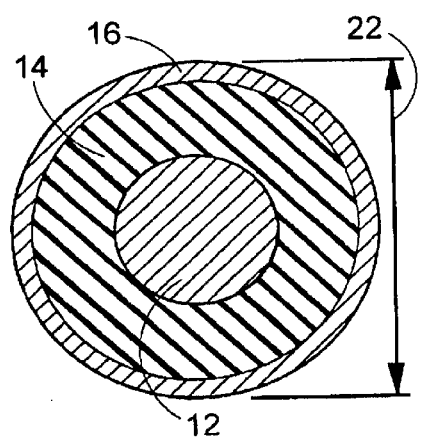

Referring to FIGS. 4 & 5, once the bushing retainer 16 is placed around the bushing 14, the bushing retainer 16 is reduced to a second, smaller outer diameter 22. As the outer diameter of the bushing retainer 16 is reduced, the bushing retainer 16 compresses the bushing 14. When the bushing retainer 16 is reduced to the second diameter 22, the bushing retainer 16 compresses the bushing 14 against the stabilizer bar 12 with enough force to create a frictional engagement between the stabilizer bar 12 and the bushing 14, which will prevent relative movement of the bushing 14 and the stabilizer bar 12. Preferably, the bushing retainer 16 is crimped down to the second diameter 22, however, other known methods can be employed to reduce the diameter of the bushing retainer 16 and induce the necessary compressive force.

Figure 6:
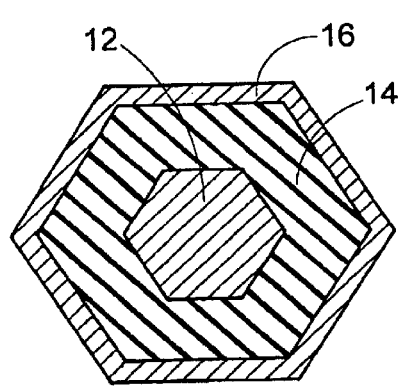
Figure 7:
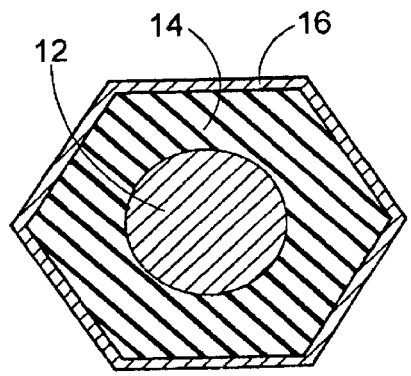

Preferably, the stabilizer bar 12 has a cross-sectional shape having mirrored longitudinal halves, and the bushing 14 and the bushing retainer 16 have cross-sectional shapes corresponding to the cross-sectional shape of the stabilizer bar 12. As shown in FIG. 5, the bushing retainer 16 is reduced from a circular shape to a circular shape. However, the shape of the bushing retainer 16 can be other shapes, an example of which is shown in FIG. 6, wherein the bushing retainer 16 and stabilizer bar 12 are hexagonal. Alternatively, the cross-sectional shape of the bushing retainer 16 and the stabilizer bar 12 can be different, as shown in FIG. 7, wherein the bushing retainer 16 is reduced to a hexagonal shape and the stabilizer bar 12 is round.

Referring again to FIGS. 1–3, a mounting bracket 24 is attached to the bushing retainer 16 to allow the bushing retainer 16 to be mounted to a structural component of the automobile. Preferably, the mounting bracket 24 includes mounting holes 25 that allow the mounting bracket 24 to be attached to the structure of an automobile. With the bushing 14 being made from a resilient material that allows limited movement of the stabilizer bar 12 relative to the bushing retainer 16, the bushing assembly 13 provides a spring rate and dampening of the torsional, radial, and axial movement of the stabilizer bar 12 relative to the structure of the vehicle.

Figure 8:
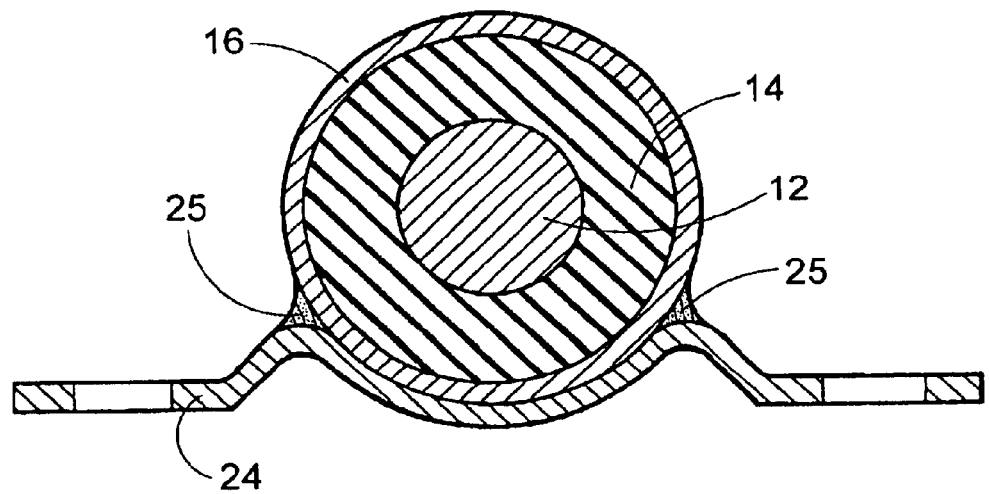
FIGS. 8–11 are sectional views of FIG. 3 showing various and alternative aspects of the first preferred embodiment.
Figure 9:
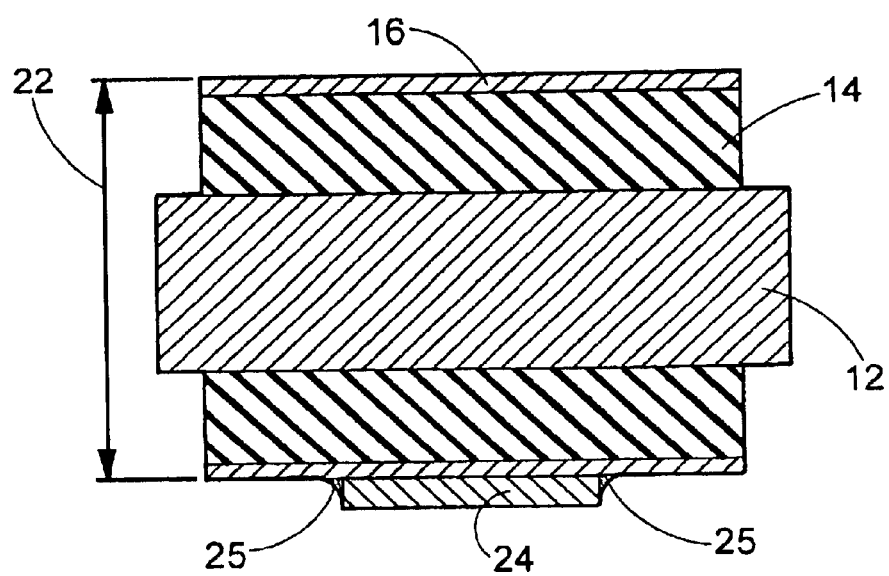
Figure 10:
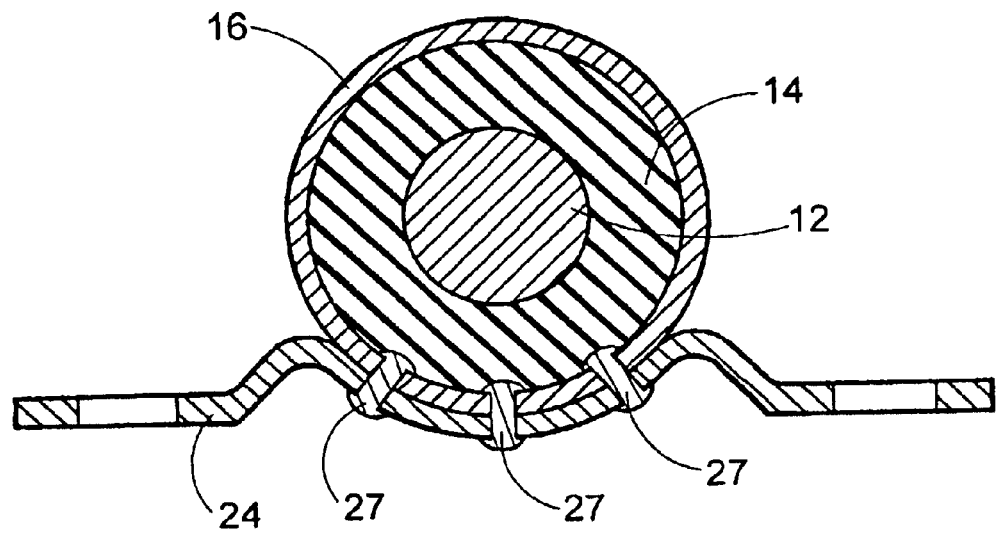
Figure 11:
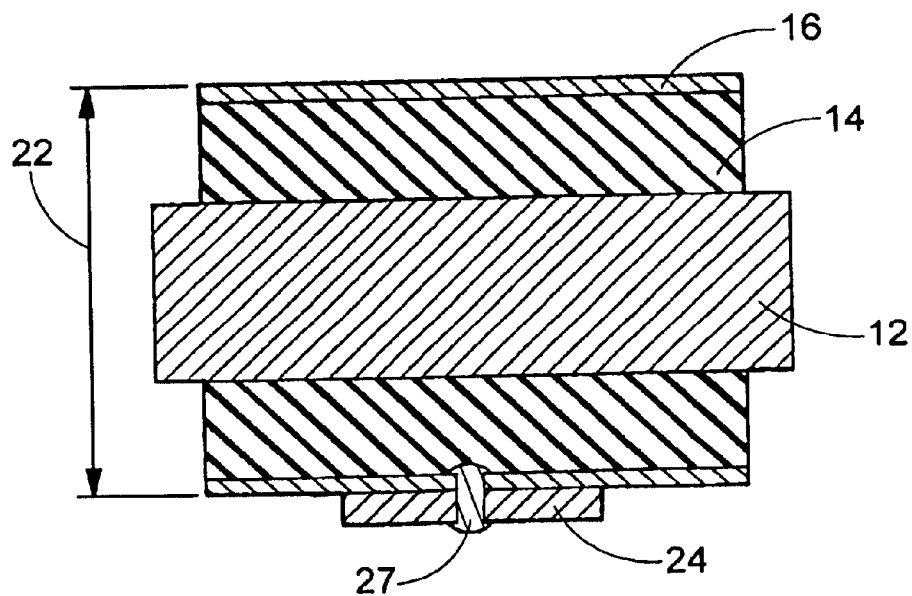

FIG. 3 illustrates a first preferred embodiment where the mounting bracket 24 is a generally flat piece which is contoured to meet a portion of the outer surface of the bushing retainer 16 and is adapted to be attached to a structural component of the vehicle and wherein the mounting bracket 24 is positioned between the bushing retainer 16 and a structure of the vehicle. The mounting bracket 24 can be welded onto the bushing retainer 16, as shown by the weld points 25 in the sectional views of FIGS. 8 and 9, or alternatively, the mounting bracket 24 can be riveted onto the bushing retainer 16, as shown by the rivets 27 in the sectional views of FIGS. 10 and 11. The mounting bracket 24 can be attached to the bushing retainer 16 before the bushing retainer 16 is reduced to the second diameter 22 or after the bushing retainer 16 is reduced to the second diameter 22.

Figure 12:
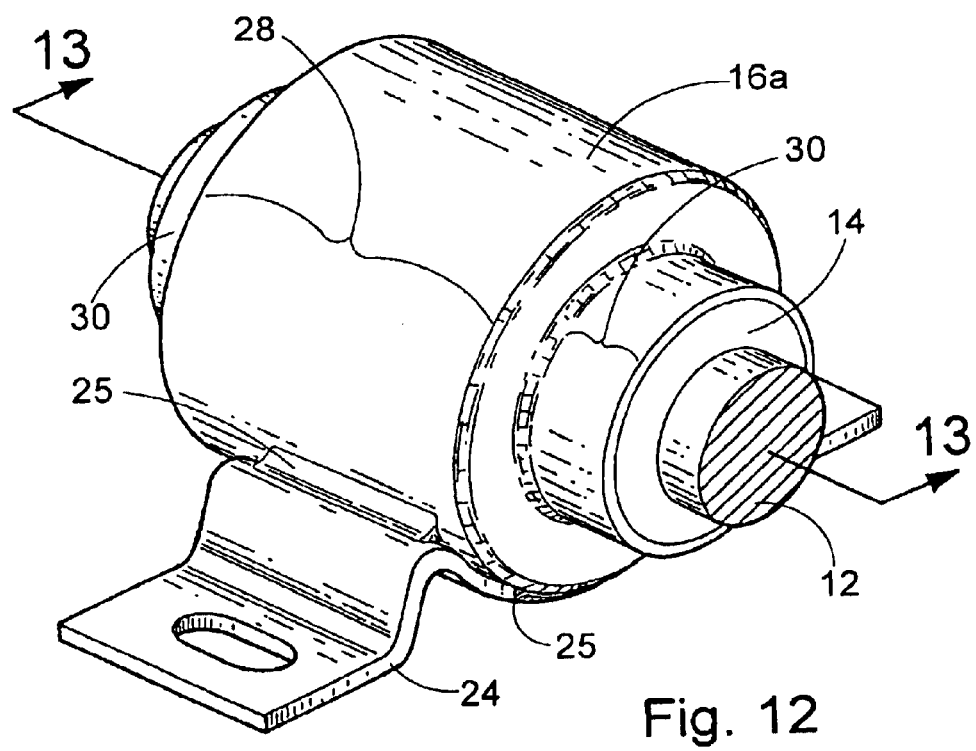
FIG. 12 is a perspective view similar to FIG. 3, wherein the bushing retainer has a stepped profile.
Figure 13:
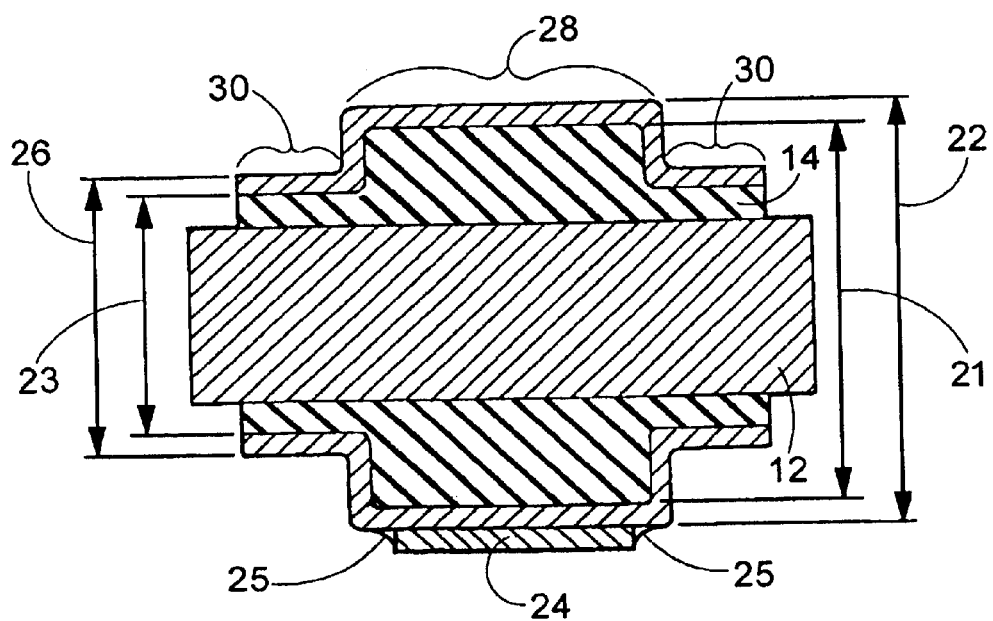
FIG. 13 is a sectional view taken generally along line 13—13 of FIG. 12 and showing the stepped profile of the bushing retainer.

Referring again to FIGS. 9 and 11, the bushing retainer 16 is reduced to a uniform second diameter 22 along an entire length of the bushing retainer 16. The bushing 14 is therefore compressed uniformly over the entire length of the bushing retainer 16. Alternatively, the stabilizer bar assembly 10 can include a stepped bushing retainer 16a as shown in FIGS. 12 and 13. In the stepped configuration, after the bushing retainer 16a has been reduced to the second diameter 22, some portions of the bushing retainer 16a are then reduced to a third diameter 26 that is smaller than the second diameter 22. As shown in FIGS. 12 and 13, portions of the bushing retainer 16 adjacent opposite ends of the bushing retainer 16 are reduced to the third diameter 26. The stepped bushing retainer 16a defines sections wherein the compression of the bushing 14 is different.

As shown in FIGS. 12 and 13, a first section 28 is defined by a central portion of the bushing retainer 16a that has been reduced to the second diameter 22, and a second section 30 is defined by the end portions of the bushing retainer 16a, adjacent opposite ends of the bushing retainer 16a which have been reduced to the third diameter 26. As a result of having varying outer diameters 22, 26, the bushing retainer sections 28, 30 also preferably have varying inner diameters. More specifically, the first section 28 has a first section inner diameter 21 and the second section 30 has a second section inner diameter 23. The bushing retainer 16a preferably has a substantially constant thickness in the first section 28 and the second section 30 such that the second section inner diameter 23 is smaller than the first section inner diameter 21. Additionally, the amount of compression that the bushing 14 undergoes in the respective areas of the bushing 14 adjacent to the first and second sections 28, 30 is substantially related to the inner diameters 21, 23 of the first and second sections 28, 30. Therefore, the portions of the bushing 14 within the first section 28 are not compressed as much as the portions of the bushing 14 within the second section 30. Therefore, the portions of the bushing 14 within the second section 30 will provide more stiffness and a higher spring rate.

One advantage of the present invention is that the same stabilizer bar assembly can be used for applications requiring different spring rates within the bushings 14. The effective spring rate of the bushings 14 will depend on the amount of compression that is exerted by the bushing retainer 16. The same assembly can have different spring rates by simply modifying the pressure at which the bushing retainers are crimped. If the stabilizer bar assembly 10 is to be put into a vehicle which requires a soft suspension feel, then the bushing retainer 16 can be reduced to a second diameter 22 which compresses the bushing 14 but still provides a soft feel. If the stabilizer bar assembly 10 is to be installed in a vehicle requiring a stiff suspension, then the bushing retainer 16 can be reduced to an even smaller second diameter 22, thereby compressing the bushing 14 to a greater extent, and providing a stiffer feel to the suspension.

The present invention will also add uniformity to the manufacturing of the stabilizer bar systems. When standard bushings and mounting brackets are used, manufacturing variances between parts will cause one assembly to perform slightly different than another one. The amount of crimping of the bushing retainers 16 of the present invention can be controlled by pressure, so that each individual system is compressed until the compression pressure of the bushing 14 meets the specification. In this way, even if there are variances in the size of the bushing retainers 16 and bushings 14, the compression pressure will be the same, thereby providing more consistent stiffness to the stabilizer bar systems 10.

Additionally, the stabilizer bar of the present invention will allow the bushings 14 to be repaired. Over time, as the bushings 14 loose some of their resiliency, their spring rate will change, causing the feel of the vehicle to change. In order to modify the spring rate, all that is required is to re-crimp the bushing retainer 16 to the desired compression pressure. This will allow an older vehicle to have the suspension stiffness adjusted or repaired without having to replace any components of the stabilizer bar system.

Figure 14:
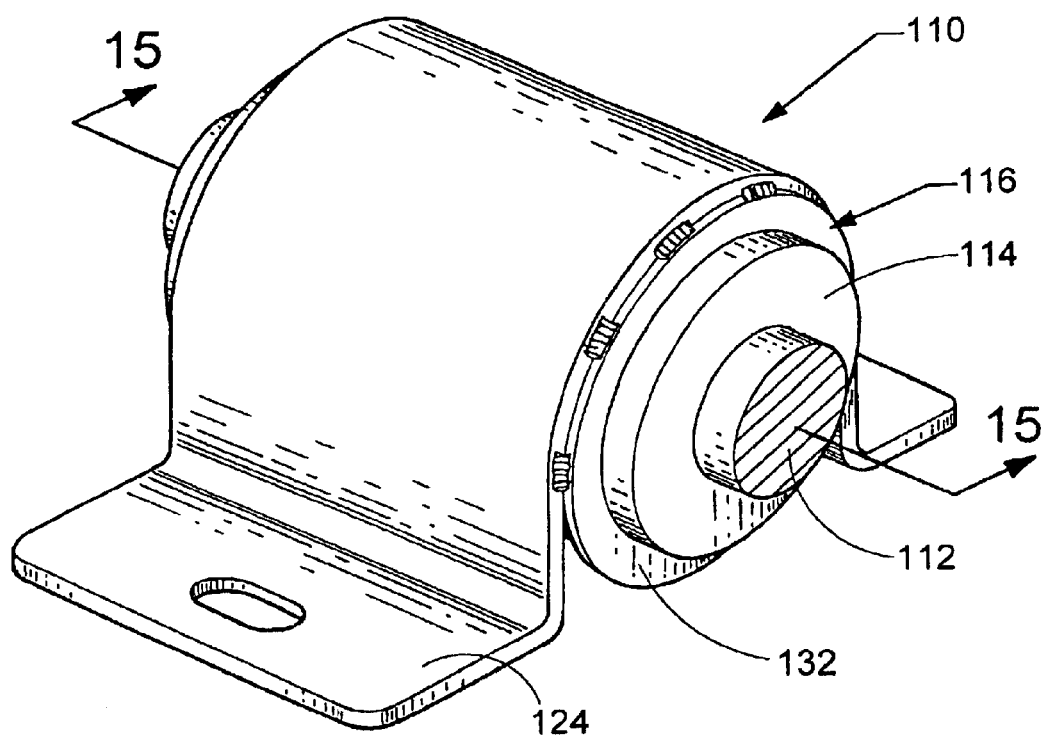
FIG. 14 is a perspective view of a second preferred embodiment of the present invention.
Figure 15:
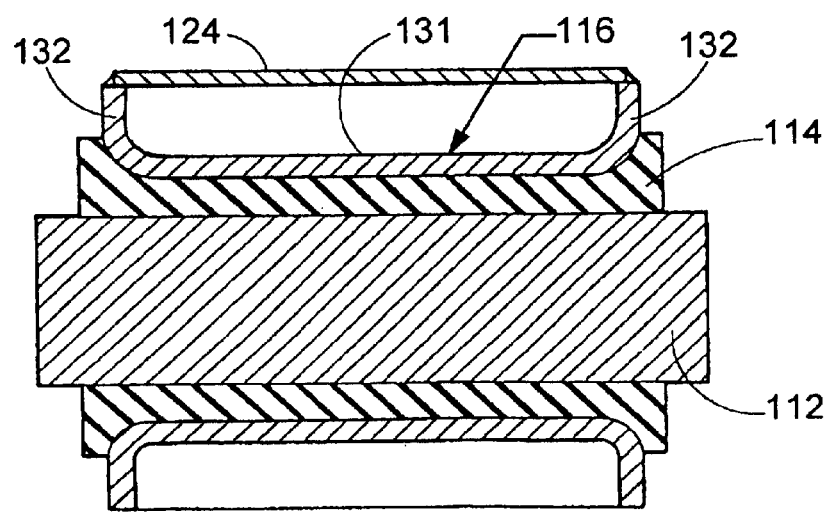
FIG. 15 is a sectional view of the second preferred embodiment taken generally along line 15—15 of FIG. 14.

A second preferred embodiment of the stabilizer bar assembly is shown in FIG. 14 and designated at reference numeral 110, wherein a bushing 114 is positioned onto a stabilizer bar 112 and a bushing retainer 116 secures the bushing 114 onto the stabilizer bar 112. A mounting bracket 124 extends around and over the bushing retainer 116 to capture the bushing retainer 116 between a structure of the vehicle and the mounting bracket 124. As shown in FIG. 15, the bushing retainer 116 of the second preferred embodiment has a reduced diameter center section 131 and includes flanges 132 extending radially outward at the ends of the bushing retainer 116. The mounting bracket 124 extends over and around the bushing retainer 116, is supported on the flanges 132 of the bushing retainer 116, and is welded thereto.

Figure 16:
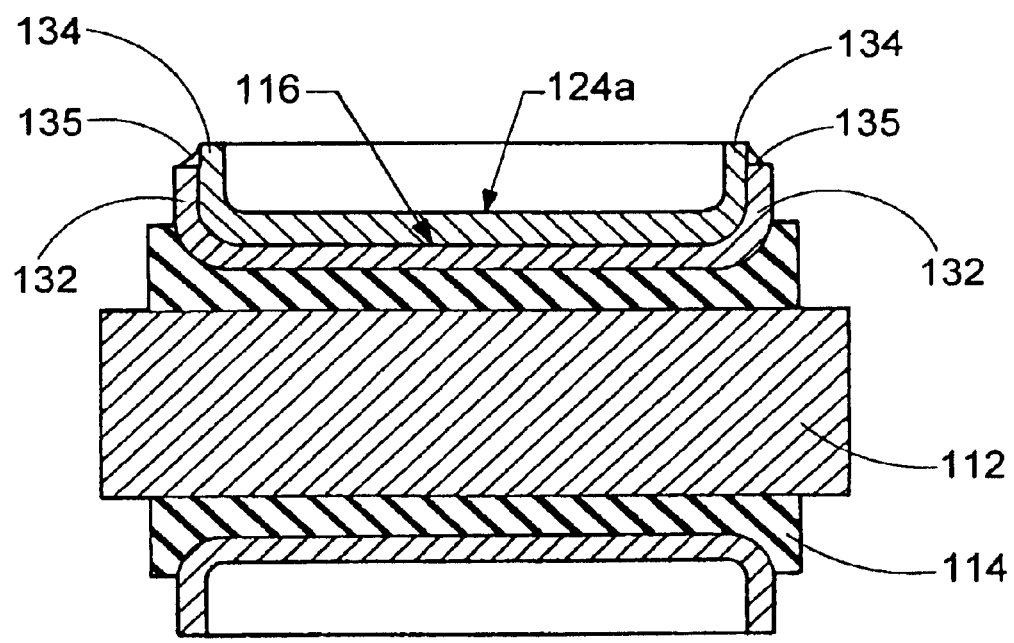
FIGS. 16 and 17 are sectional views similar to FIG. 15 showing alternative variations of the second preferred embodiment.
Figure 17:
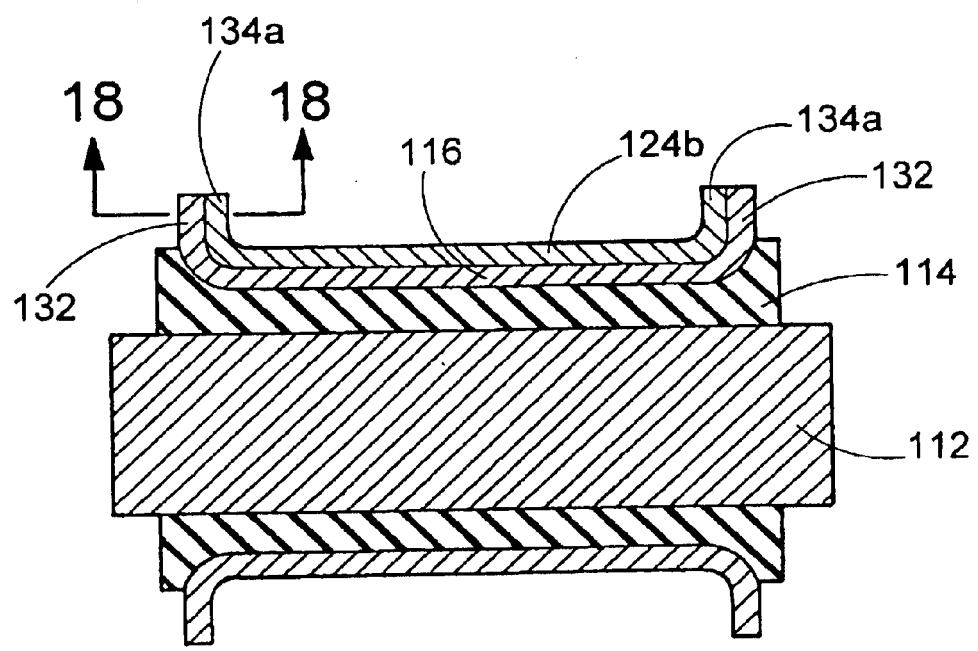
Figure 18:
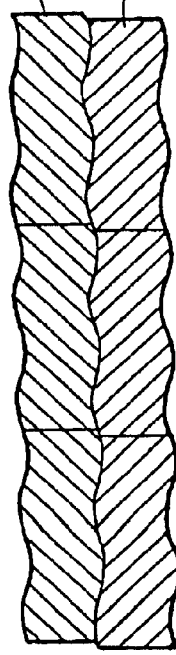
FIG. 18 is a sectional view taken generally along line 18—18 of FIG. 17 and showing the crimping of the bushing retainer and the mounting bracket.

Alternatively, the second preferred embodiment can include a mounting bracket 124*a* which is contoured to fit between the flanges 132 of the bushing retainer 116. Preferably, the mounting bracket 124*a* fits between the flanges 132 and includes radially extending flanges 134 which contour to the profile of the bushing retainer 116 as shown in FIG. 16. The flanges 134 of the contoured mounting bracket 124*a* extend out beyond the flanges 132 of the bushing retainer 116 to facilitate welding 135 of the mounting bracket 124*a* onto the bushing retainer 116. In a variation, shown in FIGS. 17 and 18, the mounting bracket 124*b* includes flanges 134*a* that are coterminous with the flanges 132 of the bushing retainer 116, wherein the flanges 132 and 134*a* are crimped together, thereby retaining the mounting bracket 124*b* onto the bushing retainer 116.

Figure 19:
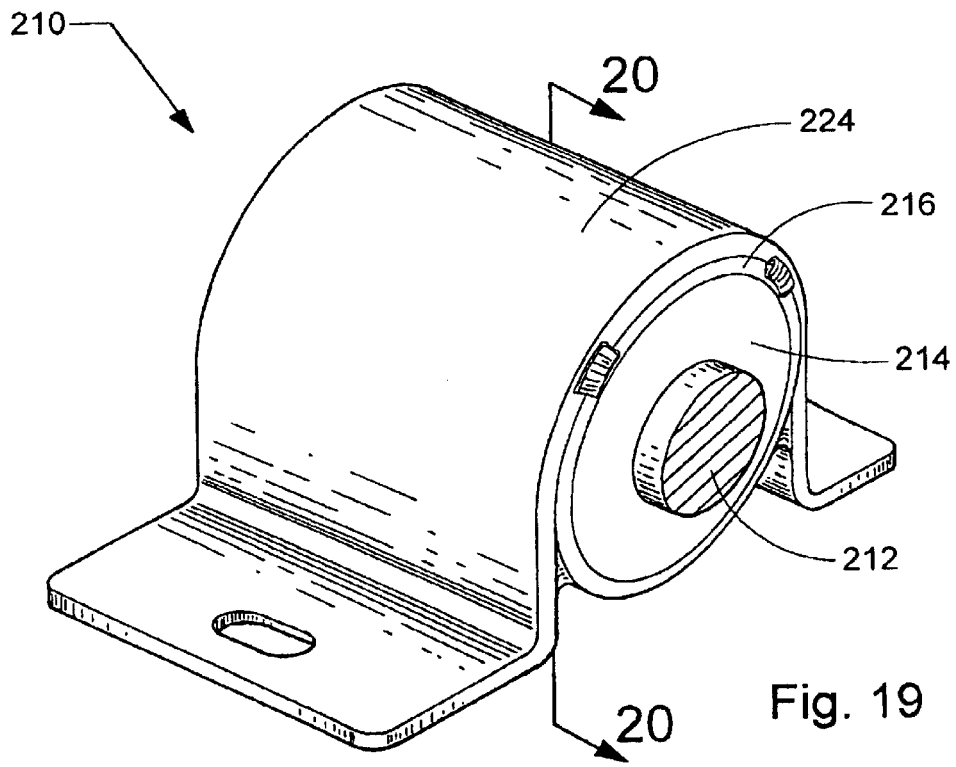
FIG. 19 is a perspective view of a third preferred embodiment of the present invention.

A third preferred embodiment of the stabilizer bar assembly is shown in FIG. 19 and is designated as reference numeral 210. The third preferred embodiment includes a stabilizer bar 212 having a bushing 214 secured thereon by a bushing retainer 216. The bushing retainer 216 of the third preferred embodiment 210 is a cylindrical sleeve and does not include flanges. A mounting bracket 224 similarly does not include flanges and extends over and around the bushing retainer 216 to secure the bushing retainer 216 between the mounting bracket 224 and a structural component of the vehicle.

Figure 23:
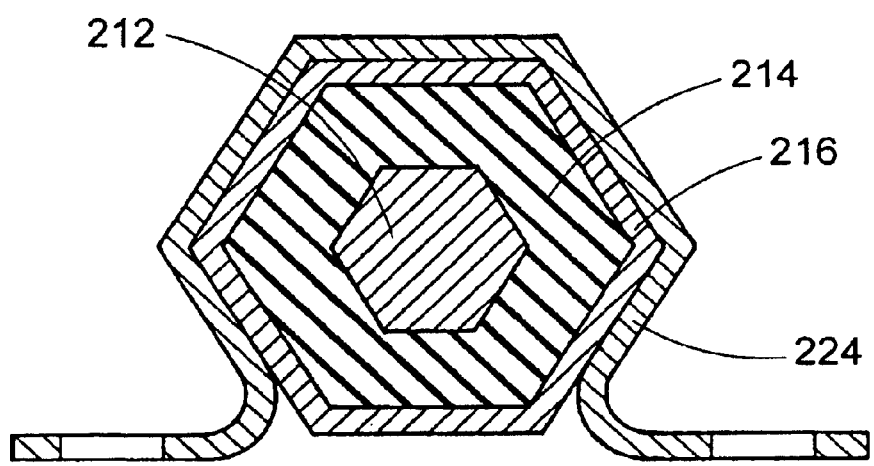
FIGS. 21–23 are sectional views similar to FIG. 20 showing alternative aspects of the third preferred embodiment.
Figure 20:
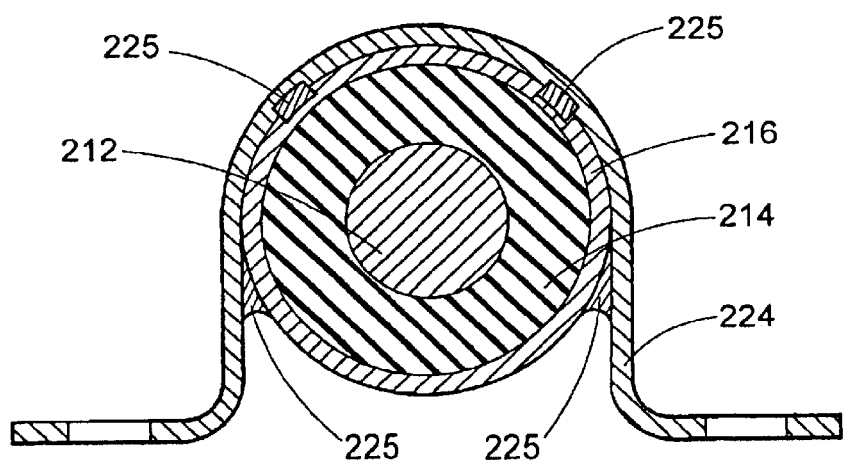
FIG. 20 is a sectional view taken generally along line 20—20 of FIG. 19 and showing how the mounting bracket engages the bushing retainer.
Figure 21:
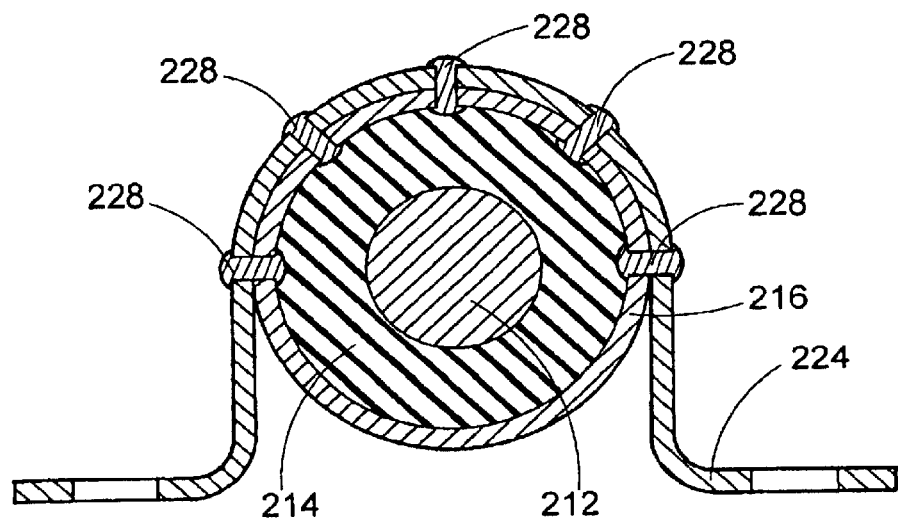
Figure 22:
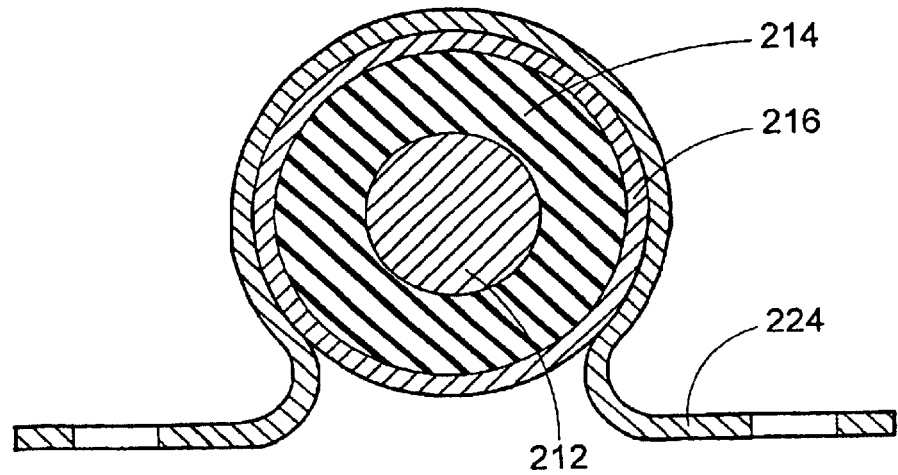

The mounting bracket 224 can be secured to the bushing retainer 216 by welding as shown by the weld points 225 in FIGS. 19 and 20, or alternatively, the mounting bracket 224 can be riveted to the bushing retainer 216, as shown by the rivets 228 in FIG. 21. The mounting bracket 224 can also be crimped to the bushing retainer 216 as shown in FIG. 22, however, in order to keep the bushing retainer 216 from rotating within the mounting bracket 224, a non-circular shape would be preferred when crimping the mounting bracket 224 onto the bushing retainer 216, as shown in FIG. 23.

Similarly to the first preferred embodiment, the bushing retainer 216 has a first outer diameter and an inner diameter which is sized to accommodate the bushing 214. After the bushing retainer is placed about the bushing 214, the bushing retainer 216 is reduced to a second, smaller outer diameter 222, thereby compressing the bushing 214 therein. The mounting bracket 224 can be placed to the bushing retainer 216 before or after the bushing retainer 216 is reduced to the second outer diameter 222.

Additionally, the stabilizer bar assembly 210 of the third preferred embodiment can include a stepped bushing retainer 216*a*. Either before or after the mounting bracket 224 is mounted onto the bushing retainer 216*a*, portions 229 of the bushing retainer 216*a* are further reduced to a third diameter 226, which is smaller than the second diameter 222, leaving a portion 227 which is only reduced to the second diameter 222.

Figure 24:
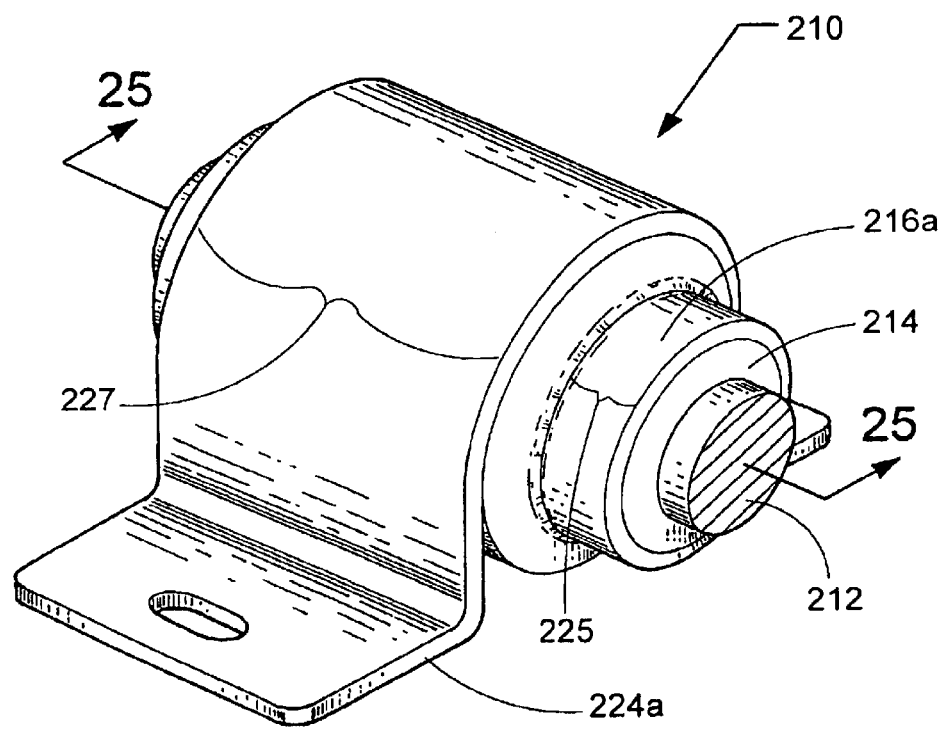
FIGS. 24–27 are views of two alternative variations of the third preferred embodiment having a stepped bushing retainer profile.
Figure 25:
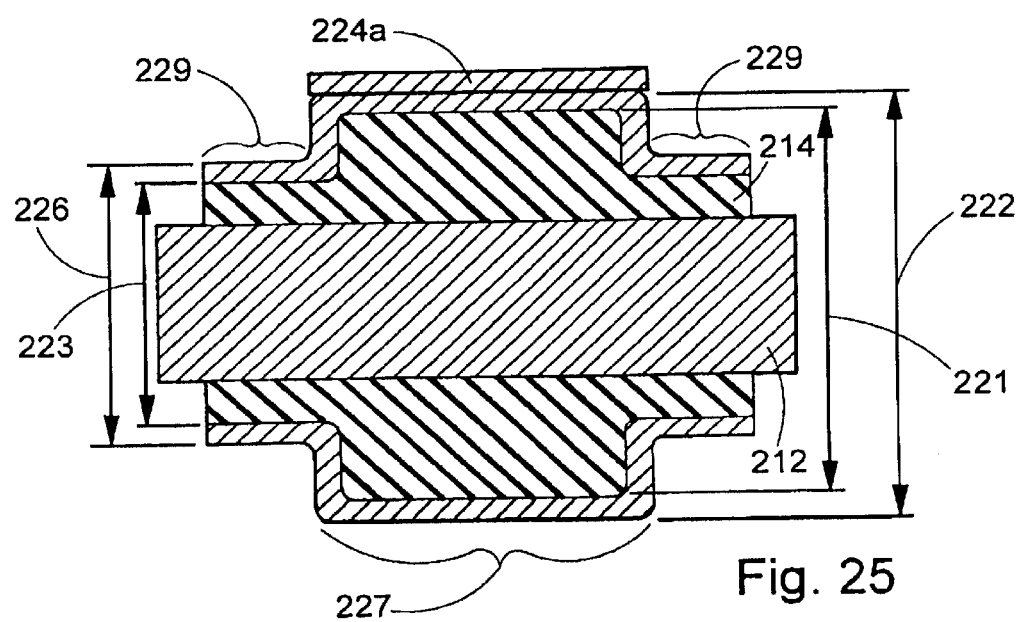
Figure 26:
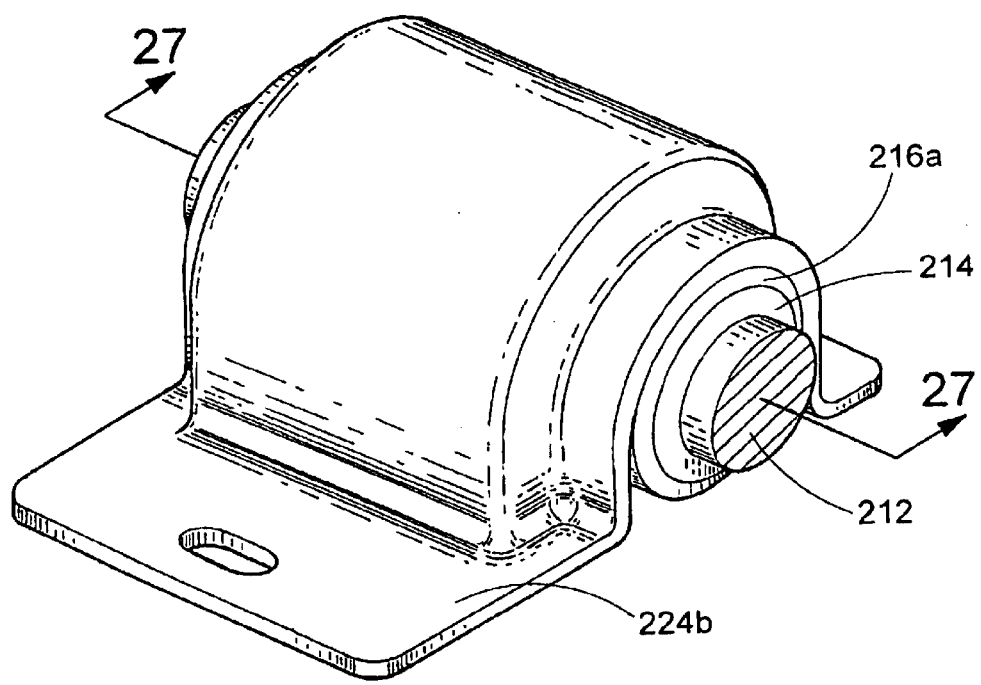
Figure 27:
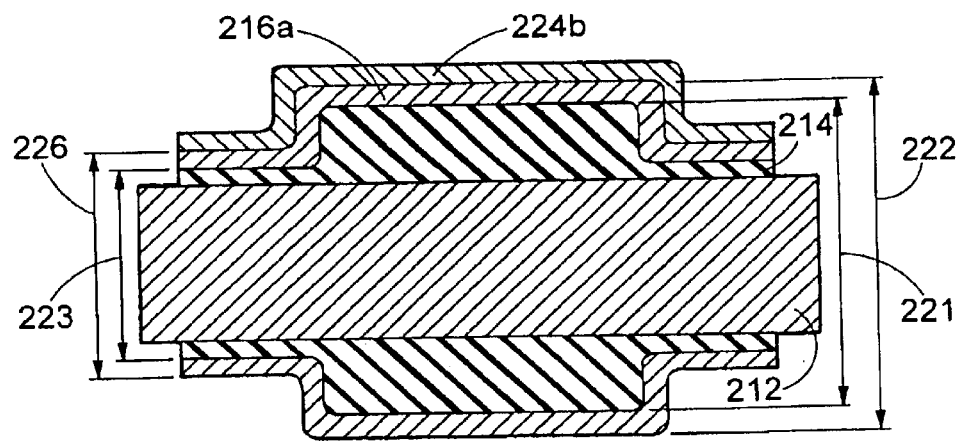

Referring to FIGS. 24 and 25, the assembly 210 can include a mounting bracket 224*a* having a width such that the mounting bracket 224*a* is only attached to the portion 227 of the bushing retainer 216*a* which is reduced to the second diameter 222. The mounting bracket 224*a* can be attached to the bushing retainer 216*a* either before or after portions of the bushing retainer 216*a* are reduced to the third diameter 226. As a result of having varying outer diameters 222, 226, the bushing retainer portions 227, 229 also preferably have varying inner diameters. More specifically, the portion 227 has an inner diameter 221 and the portion 229 has an inner diameter 223. The inner diameter 223 of portion 229 is preferably smaller than the inner diameter 221 of the portion 227. Referring to FIGS. 26 and 27, the assembly 210 includes a mounting bracket 224*b* having a width that is substantially equal to the bushing retainer 216*a* and is placed to the bushing retainer 216*a* prior to portions of the bushing retainer 216*a* being reduced to the third diameter 226. Both the bushing retainer 216*a* and the mounting bracket 224*b* are then reduced together to a stepped profile, as shown in FIGS. 26 and 27.

The foregoing discussion discloses and describes three preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A stabilizer bar assembly for an automotive vehicle comprising:

a stabilizer bar;

a bushing mounted to said stabilizer bar;

a bushing retainer extending around said bushing and radially compressing said bushing such that said bushing is in frictional engagement with said stabilizer bar and will resist movement relative to said stabilizer bar, said bushing retainer being deformable between a first position exerting a first compressive force upon said bushing and a second position exerting a second compressive force upon said bushing, said bushing retainer having a varied inner diameter such that said bushing is compressed differently within discrete sections along said length of said bushing retainer;

a mounting bracket adapted to connect said stabilizer bar to the automotive vehicle.

2. The stabilizer bar of claim 1 wherein said bushing is formed from an elastomeric material.

3. The stabilizer bar assembly of claim 1 wherein said mounting bracket is fixedly connected to said bushing retainer.

4. The stabilizer bar assembly of claim 1 further including a chemical bonding agent fixedly bonding said bushing to said stabilizer bar.

5. The stabilizer bar of claim 1 wherein said stabilizer bar has a longitudinal cross-sectional shape having mirrored halves.

6. The stabilizer bar of claim 5 wherein said bushing and said bushing retainer have transverse cross-sectional shapes corresponding to a transverse cross-sectional shape of said stabilizer bar.

7. The stabilizer bar of claim 1 wherein said bushing retainer is deformable to increase frictional engagement between said bushing and said stabilizer bar.

8. The stabilizer bar of claim 7 wherein said bushing retainer is capable of further compression.

9. A method of inducing a pre-load onto a bushing that supports a stabilizer bar including:

providing a stabilizer bar;

placing a bushing onto the stabilizer bar;

placing a bushing retainer about the bushing, the bushing retainer having a first exterior dimension;

deforming the bushing retainer and reducing the first exterior dimension of at least a portion of the bushing retainer to a second exterior dimension that is smaller than the first exterior dimension, such that the bushing retainer radially compresses the bushing;

further including the step of reducing the second exterior dimension of at least a portion of the bushing retainer to a third exterior dimension that is smaller than the second exterior dimension such that the bushing retainer has a varied inner diameter, thereby compressing the bushing differently within discrete sections along the length of the bushing retainer.

10. The method of claim 9 wherein the step of reducing the first exterior dimension of the bushing retainer includes crimping the bushing retainer.

11. The method of claim 9 further comprising the step of attaching a mounting bracket onto the bushing retainer.

12. The method of claim 11 wherein the step of attaching the mounting bracket onto the bushing retainer includes attaching the mounting bracket to the bushing retainer by one of the group comprising: welding, riveting and crimping.

13. The method of claim 11 wherein the step of attaching the mounting bracket to the bushing retainer is performed prior to the step of reducing the first exterior dimension of the bushing retainer.

14. The method of claim 11 wherein the step of attaching the mounting bracket to the bushing retainer is performed after the step of reducing the first exterior dimension of the bushing retainer.

15. The method of claim 11 wherein the step of reducing the second exterior dimension is performed after the step of attaching the mounting bracket to the bushing retainer.

16. The method of claim 11 wherein the step of reducing the second exterior dimension is performed before the step of attaching the mounting bracket to the bushing retainer.

* * * * *